United States Patent [19]
Fortunato

[11] Patent Number: 5,829,552
[45] Date of Patent: Nov. 3, 1998

[54] METHOD, DEVICE AND COMPOSITION FOR USE IN THE MAINTENANCE OF TRACK EQUIPMENT

[75] Inventor: Francis Fortunato, Tourooing, France

[73] Assignee: Societe Industrielle De Produits Speciaux S.I.P.S., Faches-Thumesnil, France

[21] Appl. No.: 532,574

[22] PCT Filed: Apr. 26, 1994

[86] PCT No.: PCT/FR94/00476

§ 371 Date: Oct. 26, 1995

§ 102(e) Date: Oct. 26, 1995

[87] PCT Pub. No.: WO94/25674

PCT Pub. Date: Nov. 10, 1994

[30] Foreign Application Priority Data

Apr. 26, 1993 [FR] France .................................. 93 04899

[51] Int. Cl.⁶ .................................................. B61K 3/00
[52] U.S. Cl. .......................................... 184/3.1; 184/6.21
[58] Field of Search .................... 184/6.21, 3.1, 184/3.2

[56] References Cited

U.S. PATENT DOCUMENTS

| | | |
|---|---|---|
| 3,838,646 | 10/1974 | Smith et al. ............................ 184/3.1 |
| 3,883,439 | 5/1975 | Bergeron ................................. 252/37.2 |
| 3,987,869 | 10/1976 | Bowers .................................. 184/105.1 |
| 4,262,776 | 4/1981 | Wilson, et al. . |
| 4,327,144 | 4/1982 | Wintringham ........................... 184/3.1 |
| 4,520,901 | 6/1985 | Borup et al. ............................. 184/3.1 |
| 4,754,848 | 7/1988 | Azzopard et al. ...................... 184/6.26 |
| 5,247,957 | 9/1993 | Weisse ....................................... 137/3 |
| 5,251,725 | 10/1993 | Barrett, Jr. .............................. 184/6.14 |
| 5,318,711 | 6/1994 | Evans et al. ............................... 252/34 |

FOREIGN PATENT DOCUMENTS

| | | |
|---|---|---|
| 2488676 | 8/1980 | France . |
| 2004955 | 11/1979 | United Kingdom . |

*Primary Examiner*—Thomas E. Denion
*Attorney, Agent, or Firm*—Fisher, Christen & Sabol

[57] ABSTRACT

Method for use in the maintenance of track equipment of the type comprising at least one movable element and a stationary element whose respective contact surfaces come into engagement with one another. The method is characterized by coating the contact surfaces with a given quantity of a composition comprising at least one product with lubrifying properties and a solvent with a high evaporation coefficient.

5 Claims, 6 Drawing Sheets

METHOD, DEVICE AND COMPOSITION FOR USE IN THE MAINTENANCE OF TRACK EQUIPMENT

FIELD OF THE INVENTION

The present invention relates to a method, device and composition intended for use in the maintenance of track equipment. The invention is more particularly applicable in the domain of railway track equipment, and more particularly still, of switches or points.

BACKGROUND OF THE INVENTION

It is known that railway track equipment requires relatively frequent maintenance operations, consisting in particular in coating the track equipment or depositing thereon a certain quantity of products presenting lubrifying, anti-rust and weather-proofing properties.

These products or compositions are, in known manner, in the form of a relatively viscous, even very viscous or even consistent paste, transported in recipients and applied on the appropriate parts of the track equipment with the aid of a tool such as a trowel, a supple metal spatula or a brush.

This prior-art modus operandi presents numerous drawbacks.

In the first place, the nature of the product used, and more particularly its high viscosity, combined with the tools employed, obliges the operators to work either on their knees or with their legs straight and their back bent down towards the ground. It will be readily understood that such postures are extremely tiring and toilsome.

In the second place, the known techniques of application of such maintenance products are extremely long. In fact, by way of example, the maintenance of a simple switch requires 45 minutes for two persons. This relatively long duration, multiplied by the number of switches to be maintained, if only on a station site, involves immobilizing a large number of persons for extremely long periods, incompatible with economic imperatives. This is all the more true as an extra person is generally necessary to ensure safety of the team effecting the maintenance operations.

In the third place, the known products, apart from their relative difficulty of application, as mentioned above, are not satisfactory from the standpoint of maintenance and keeping in repair. In the case of switches, it is known that the mobile part thereof moves on a bearing. The known products, taking into account their high viscosity and their nature, applied on the bearing and the mobile part, do not perform their role of lubricant for the following reason. During manoeuvre of the switches, the mobile part passes from a first extreme position to a second extreme position and, on doing so, provokes an effect of sweeping the bearing and more precisely an effect of the "windscreen wiper" type which in fact ends in wiping to some extent the bearing and therefore removing the lubricating product. This in itself already goes against the purpose aimed at. This sweeping or wind-screen wiper effect presents another extremely damaging consequence, namely that the product is pushed towards the extreme positions of the mobile part of the switches and it accumulates at the extreme positions. The accumulated product, subjected to bad weather, finishes by hardening. The hardened product cannot be evacuated in these positions and this results in a blocking of the mobile part after some manoeuvres of the switches as the hardened accumulated product forms a stop which limits the movement of the mobile part of the switches. This is extremely detrimental per se as the mobile part is supposed to present a given clearance. A smaller clearance risks endangering the functioning of the device and therefore the trains likely to pass over the switches. This limited clearance of the mobile part of the switches raises another major difficulty. The mobile part of the track equipment is generally driven in motion by an electric motor. This latter is switched on remotely and is maintained in operation until the mobile part of the switches has passed over the stroke corresponding to the normal clearance of the mobile part. Now, the accumulated product, after some manoeuvres, as described hereinabove, forms an accumulation preventing the mobile part of the switches from continuing its stroke. The maximum stroke not having been attained, the motor continues to be supplied, while it is immobilized and can no longer rotate. This results in time in the motor being damaged, requiring the intervention of a specialized team and in the majority of cases, replacement of the motor. These effects are extremely damaging from the financial standpoint, due to the intervention of the maintenance team which must intervene to repair the motor, besides the cost of this latter.

Another difficulty associated with the use of track equipment is that, by definition, the latter is located outside and is subjected to bad weather. As is known, the track equipment must be maintained every 3 to 5 days depending on the frequencies of manoeuvre. This relatively high frequency increases the cost of the maintenance operations. Moreover, these products harden under the effect of the atmospheric conditions, which requires a more frequent and fastidious cleaning to avoid any risks of breakdown.

SUMMARY OF THE INVENTION

In this context, the present invention proposes a method, device and composition intended for keeping in repair and maintenance of track equipment, such as switches for example, which make it possible to reduce the frequency of such operations, to carry the latter out in an extremely short time, with the resulting savings, while ensuring maintenance of the lubricating properties of the product applied on the track equipment, for a long period. Likewise, the invention enables these maintenance operations to be carried out without fatigue and in complete safety.

To that end, according to the invention, the method for maintaining track equipment, of the type comprising at least one mobile element and a stationary element called upon to bear against each other by a contact surface, is characterized in that there is deposited on said respective contact surfaces a given quantity of a composition comprising at least one body presenting lubrifying properties and a solvent with a high evaporation coefficient.

Deposit is preferably effected by projection of a cloud of product, vaporization, spray or extrusion.

The invention also relates to a device for maintaining track equipment, and comprising means for depositing on the contact surfaces of the mobile part and of the stationary part of said track equipment, a given quantity of a product presenting lubrifying properties and a solvent with high evaporation coefficient, said application means preferably being of the vaporization, spray or extrusion type.

Vaporization, spray or extrusion is preferably effected with the aid of a pressurized gas with which said lubrifying composition is mixed and advantageously with the aid of a time delay device.

According to a preferred embodiment, the device is constituted by an assembly portable on a man's back.

According to another aspect of the invention, the latter concerns a composition for maintaining track equipment, and comprising on the one hand at least one body resenting lubrifying properties and, on the other hand, at least one solvent with a high evaporation coefficient.

Said composition preferably comprises a basic oil, an agent improving viscosity, a slipping agent, an anti-wear, antioxidant and anti-rust agent, an adhesive agent and a water-repellent (hydrophobic) agent.

According to a preferred form of embodiment, the composition comprises by weight 20 to 80% of the composition described previously and 80 to 20% by weight of a solvent with a high evaporation coefficient, such as hydrocarbon, oxygenated, chlorinated solvents, or any other appropriate solvent.

BRIEF DESCRIPTION OF THE DRAWINGS

The invention will be readily understood in the light of the following description, referring to an illustrative but non-limiting example of the invention, with reference to the accompanying drawings, in which.

DESCRIPTION OF THE PREFERRED EMBODIMENTS

The invention will be described hereinafter in an illustrative but non-limiting embodiment and more particularly in an application connected with the upkeep and maintenance of railway track equipment and more particularly still of switches, without, of course, the invention being limited to this application.

Figure 1:
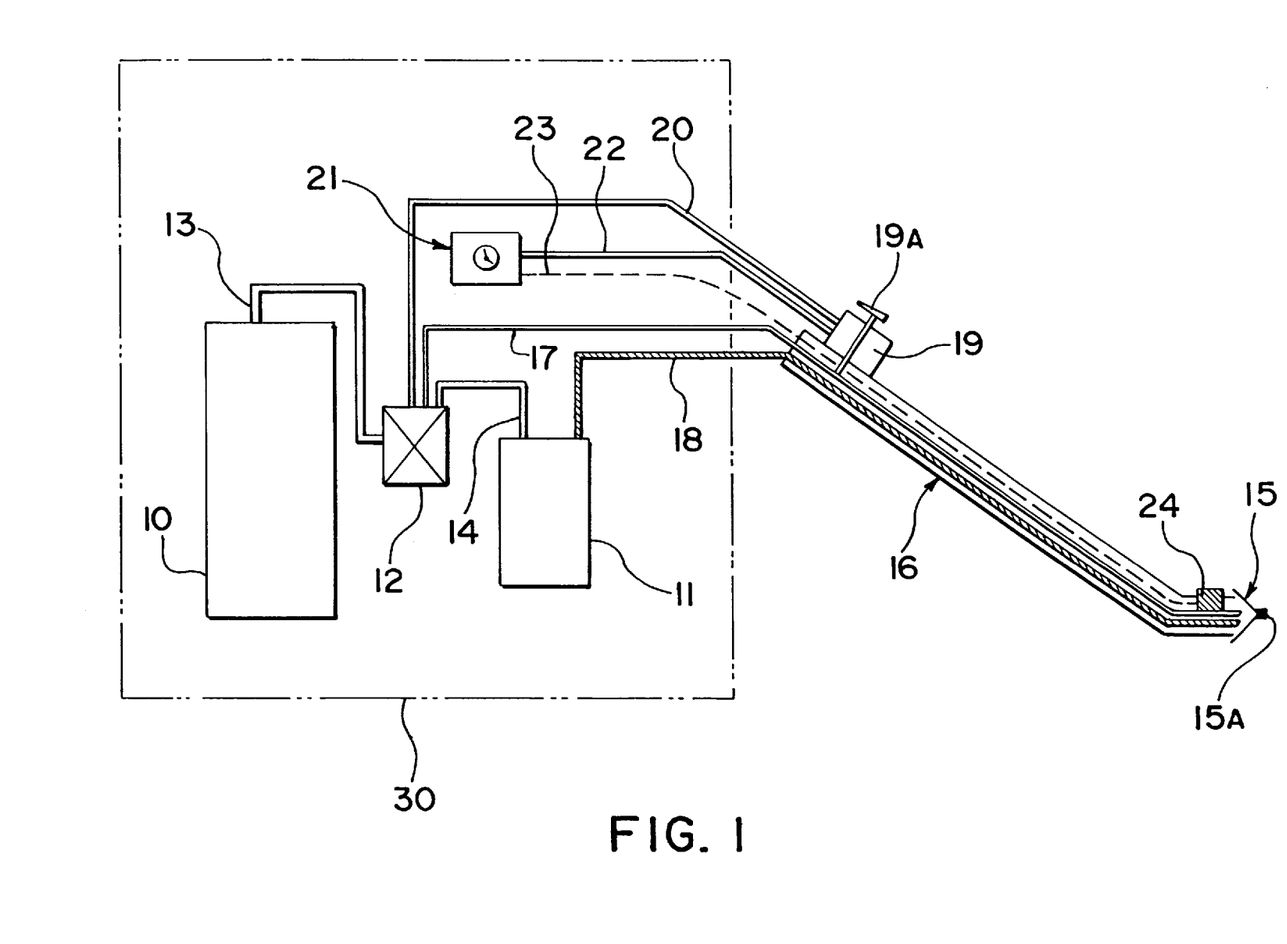
FIG. 1 shows a skeleton diagram of a form of embodiment of the invention.

The device comprises a reserve of pressurized gas, bearing reference 10 and a recipient 11 containing the lubrifying product, ready for use in liquid form. The lubrifying product is pressurized by communication of the reserve 10 with the recipient 11 via a functional unit called distributor 12, itself connected on the one hand, via a conduit 13 to the gas reserve 10 and via conduit 14 to the container 11. The device of the invention also comprises a spray 15 disposed at the lower end of a rigid tube 16 forming a spray nozzle. The length of the latter is such that it may be gripped by its upper end (opposite the spray) by a user while the spray 15 is disposed substantially at ground level where the track equipment to be maintained is located. In a variant, the container 11 may contain product under pressure, in the form of a cartridge under pressure.

The spray 15 is of type known per se and is capable of allowing mixture of the pressurized gas and the lubrifying product so as to generate a spray or vaporization containing the product mixed with pressurized gas. To that end, the distributor 12 receiving the pressurized gas from the reserve 10 is connected to the spray 15 via a conduit 17, while a conduit 18 connects the recipient 11 containing the lubrifying product to the spray 15. In the absence of pressure in the container 11, the product is extruded.

The spray nozzle 16 comprises, preferably at its upper end, a pneumatic switch 19, connected on the one hand to the distributor 12 via a conduit 20 and, on the other hand, to a time delay member 21 via a conduit 22. The time delay 21 is itself connected via a conduit 23 to a control member, such as a valve, bearing reference 24, and associated with the spray 15.

In this way, the assembly of the conduits connecting the different members together conveys pressurized gas issuing directly or indirectly from the reserve 10, with the exception of conduit 18 connecting the recipient 11 containing the lubrifying product and the spray 15.

It is understood that the representation of FIG. 1 is schematic and in fact certain of the functional units group together multiple functions. This is the case for example of the unit 12 referenced hereinabove as a distributor, but which, in fact, may also comprise members for adjusting in particular the pressures of the product and the spraying pressure.

Schematically, the device operates as follows:

The reserve of pressurized gas 10 and the recipient 11 being respectively filled with pressurized gas and with lubrifying product, the user switches on the apparatus by triggering off supply openings (known per se). It is assumed that the preliminary adjustments of the respective pressures of gas, product and spray have been effected. The same applies to the adjustment of the time delay. By way of example, the pressure of the gas in the reserve 10 is of the order of 3 to 7 bars, the spraying pressure is from 0.5 to 3.5 bars, the pressure of the lubrifying product is from 0.5 to 3.5 bars, the time delay is of the order of one second, and corresponds to the spray time.

The user places the device on his back (with the aid of carrying means (not shown in FIG. 1 and described hereinafter with reference to FIGS. 2 et seq.); the user grips the spray nozzle 16 at least with one hand. A handle is preferably provided near the switch 19 so that one of the user's fingers, preferably his thumb, can actuate the knob 19A of the timing switch 19.

In normal position, the switch is closed, which blocks supply of gas of conduit 23 towards the time delay. Likewise, the valve 24 of the spray is in normal closed position. By pressing on knob 19A of the switch 19, the user opens the circuit and in particular the conduit 23 connecting the time delay 21 to the valve 24 closing the spray 15. In this way, the pressurized gas issuing from the reserve 10 is conducted via conduit 13, then distributor 12, then conduit 20, then conduit 22, then conduit 23 towards the valve 24 which it opens. The duration of opening of valve 24 is calculated by the time delay 21. The switch 19 is of the single-trigger type,which means that one single pressure on the knob 19A provokes opening of the circuit, whatever the effective time of pressure on the knob 19A. The valve 24 being open, at the level of spray 15, the mixture issuing from conduits 17 and 18, respectively of pressurized gas and lubrifying product, is produced and is projected by spraying at the level of nozzle 15A of the spray 15.

The block in broken lines bearing reference 30 symbolizes the assembly portable on a man's back.

Figure 2:
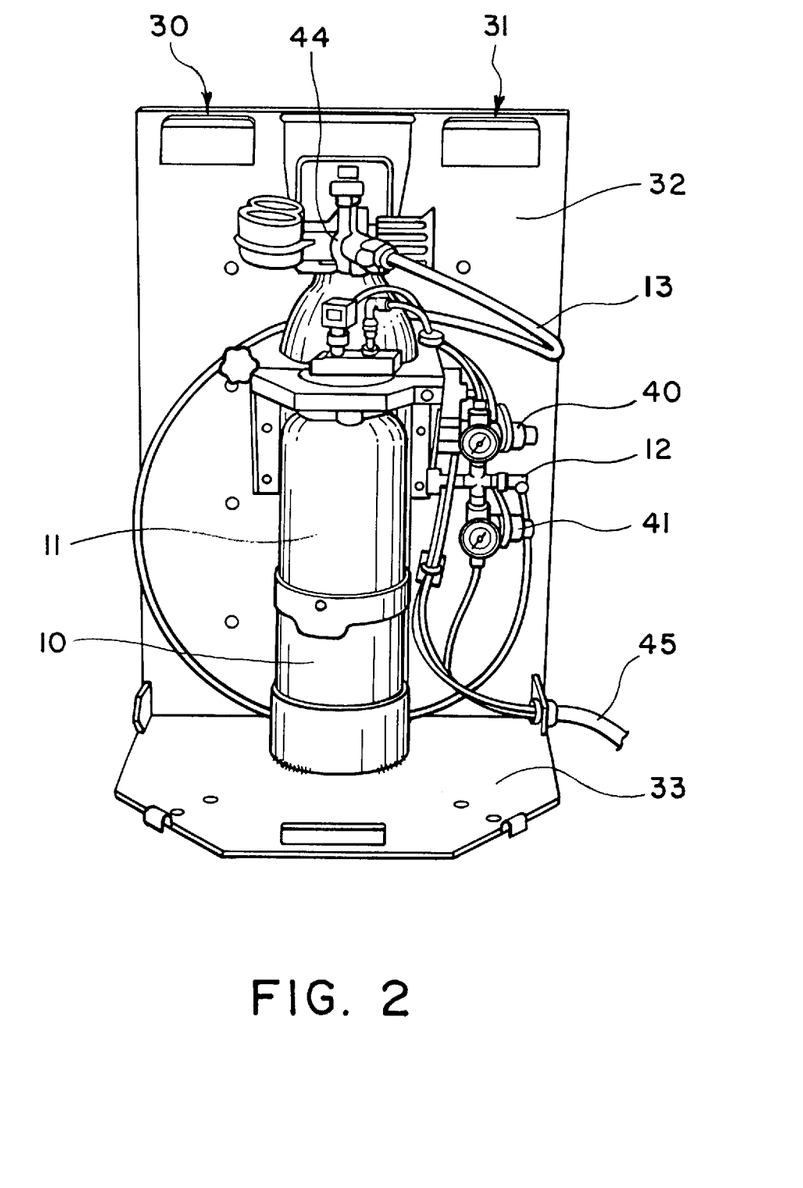
FIGS. 2 and 3 show an overall view of the device, from the back and side of the worn part of the device, respectively.
Figure 3:
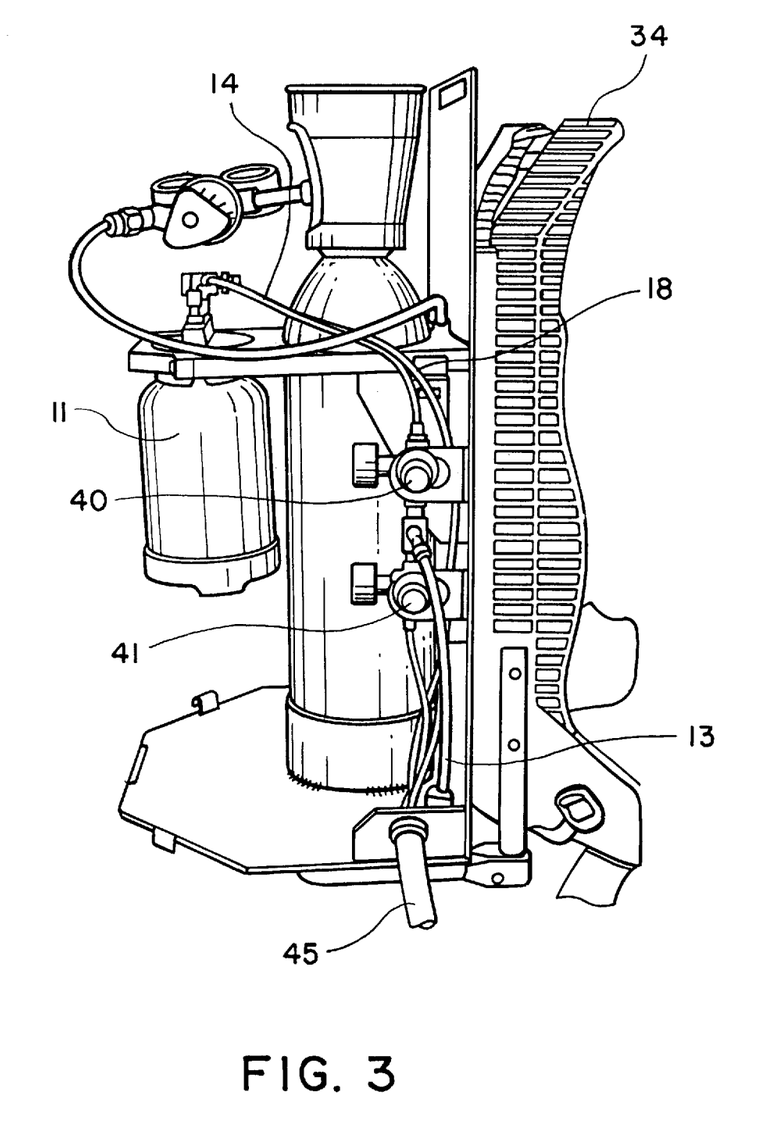
Figure 4:
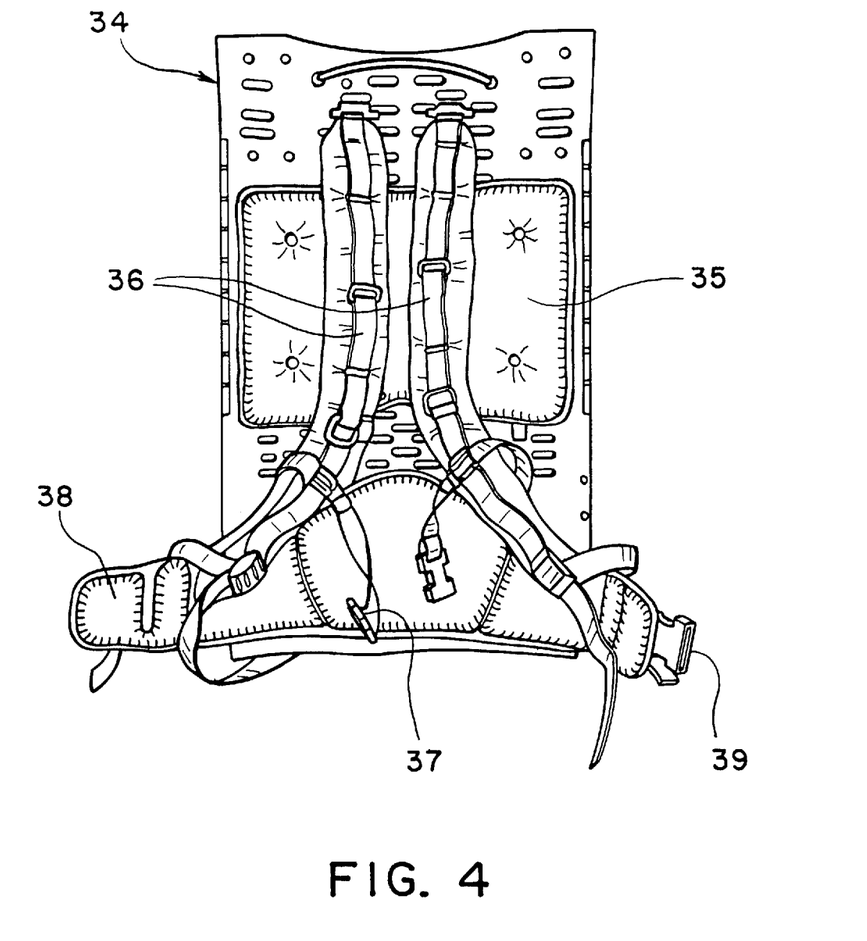
FIG. 4 shows a rear view of the carrying frame.

The following description refers more particularly to FIGS. 2 and 3 in a first step. The carrying assembly 30 includes, in accordance with the embodiment shown, a frame 31 constituted by a vertical plate 32 and a horizontal plate 33 fixed at right angles on the lower edge of the vertical plate 32. The reserve 10 of pressurized gas, in the form of a bottle of compressed air or nitrogen, known per se, is supported directly by the horizontal plate 33 serving as base. A harness 34, known per se and shown schematically in side view in FIG. 3 and in front view in FIG. 4, is fast with the frame 31 and comprises in known manner a scapular padding 35 and two carrying straps 36, as well as a lumbar padding 37 associated with two belt tabs 38 and 39. The carrying harness 34 is known per se and is inspired from the carrying technique of rucksacks.

FIGS. 2 and 3 show again the conduit 13 connecting he reserve 10 to the distributor 12. This latter preferably comprises two valves/pressure gauges intended for adjusting the pressure of the product contained in the recipient 11 and the spraying pressure, respectively. It should be noted that the lubrifying product is placed under pressure inside the container 11 by the pressurized gas of the reserve 10 via the conduits 13 and 14. The product pressure gauge bears reference 40 and the spray pressure gauge reference 41.

The conduit 13 connecting the reserve 10 of pressurized gas and the distributor 12 is associated with means for adjusting the pressure contained in the reserve 10, and also making it possible to close the supply of pressurized gas issuing from the reserve 10. These means, known per se, bear reference 44.

The carrying assembly 30 is connected to the spray nozzle 16 via a supple pipe 45 inside which are disposed an assembly of five conduits, namely conduits 17, 18, 20, 22 and 23 (cf. FIG. 1). Conduits 20 and 22 are connected to the time delay switch 19 described in greater detail in FIG. 6, while FIG. 5 shows an overall view of the spray nozzle 16.

Figure 5:
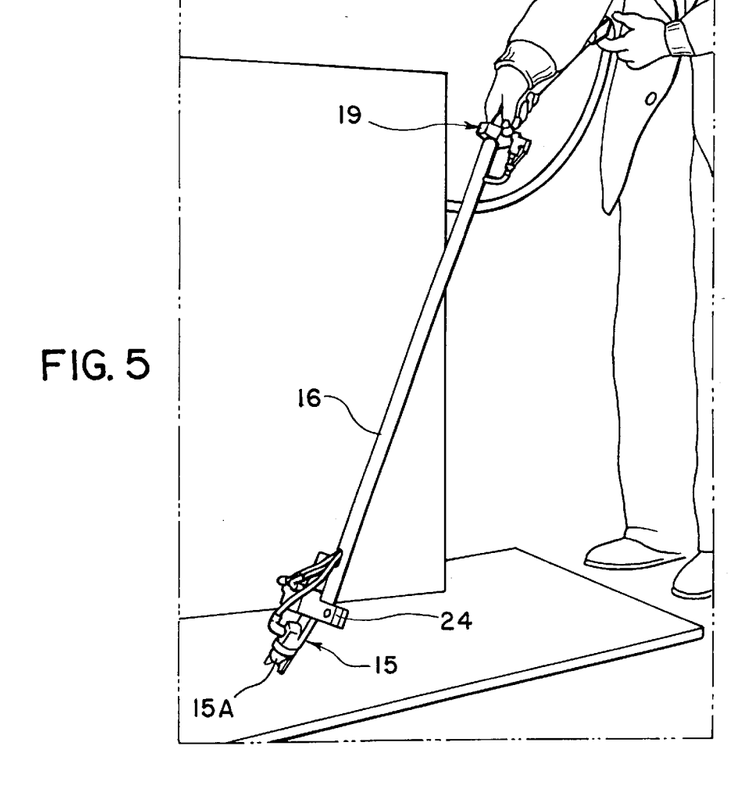
FIG. 5 shows the spray nozzle in active position.
Figure 6:
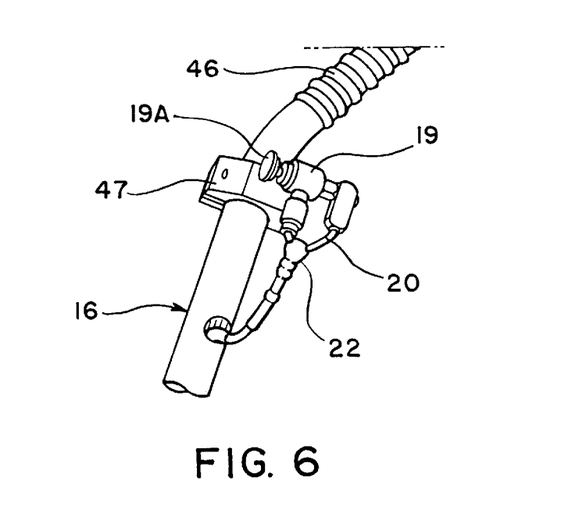
FIG. 6 shows a detailed view of the spray switch.

FIG. 6 shows a part of the spray nozzle and in particular the median or upper median part including the time switch 19, just above which is disposed a sleeve 46 allowing the user to grip, as shown more particularly in FIG. 5. The knob 19A is pressed by the user's thumb (cf. FIG. 5). The time switch 19 is for example fixed on a clamp 47 held by clamping on the spray nozzle 16.

Figure 7:
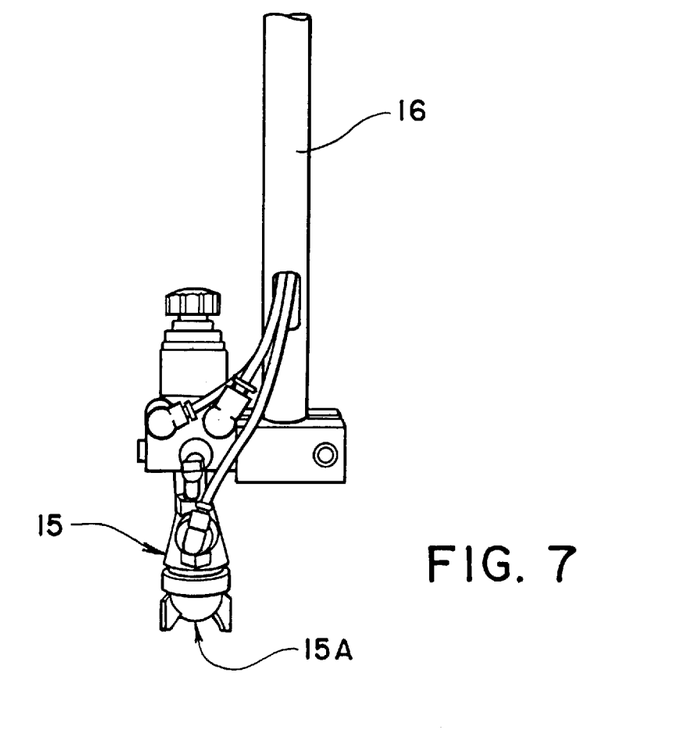
FIGS. 7 and 8 show the spray member from the front and the side respectively.
Figure 8:
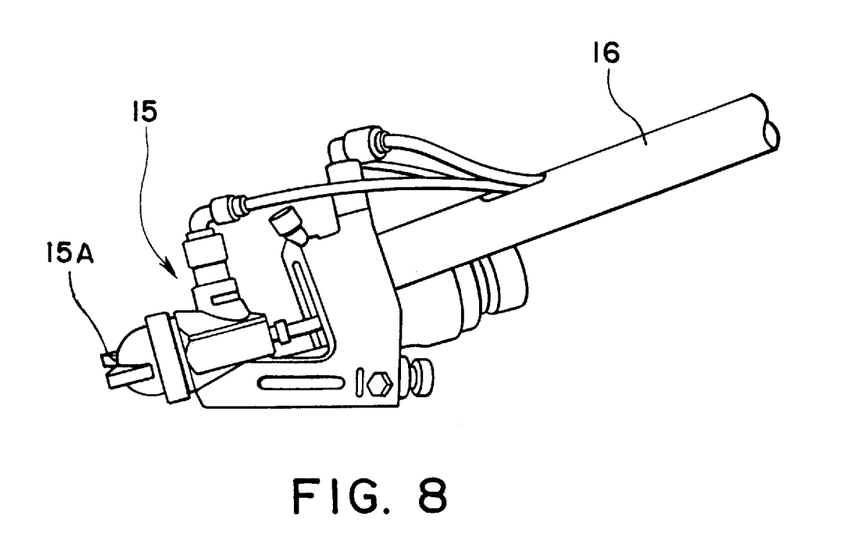

FIGS. 7 and 8 show a detailed view of the spray device 15 disposed at the end of the spray nozzle 16.

Referring again to FIG. 1, it is observed that conduits 13 and 17 conduct the pressurized gas from the reserve 10 towards the spray, while conduit 18 conducts the lubrifying product towards the spray. Conduits 20, 22 and 23 are used for controlling the valve 24 of the spray 15.

It is understood from the foregoing that the use of the device of the invention is extremely easy and upkeep and maintenance of the track equipment may be effected simply, rapidly, efficiently and without fatigue.

The invention also presents other advantages, in that, by using a product or a particular composition, it allows vaporization, spraying or extrusion of a lubrifying and maintenance product which is capable of complying with the conditions and standards required for upkeep and maintenance of track equipment such as switches.

The lubrifying composition proposed is such that it may be stored in concentrated form, then, after mixture with an appropriate solvent, applied by vaporization, spray or extrusion on the equipment to be maintained.

This presents an extremely important advantage, compared with the prior art, where the products proposed present an extremely considerable viscosity or consistency, which renders impossible or extremely difficult the application of such products other than by hand tools, of the trowel, spatula or brush type, with the drawbacks already mentioned.

The invention proposes a lubrifying composition preferably comprising lubrifying agents, in the form of a basic oil, for 20 to 80% by weight of the solution ready for use. The complement is constituted by a solvent, such as hydrocarbon, oxygenated, chlorinated solvent or any other appropriate solvent. The ready-to-use composition preferably comprises the concentrated product for 20 to 80% by weight.

Examples of compositions constituting the concentrated part to which solvent is added with a view to the application, are given hereinafter.

1) BASIC OIL (20 to 40% by weight)
   Such as:
      Mineral oil (paraffin, naphthenic, aromatic).
      Animal, vegetable oil (in the natural state or polymerized or oxypolymerized).
      Synthetic oil.

2) VISCOSITY-IMPROVING AGENT (25 to 60% by weight)
   Such as:
      Olefinic polymers and copolymers.
      Acrylic polymers and copolymers.
      Solutions of polymers based on methacrylic acid esters.
      Natural gums or ones of microbial origin.

3) SLIPPING AGENT (0.5 to 4% by weight)
   Such as:
      Unsaturated fatty acid esters.
      Vegetable and animal oil.

4) ANTI-WEAR, ANTIOXIDANT, ANTI-RUST AGENT (0.5 to 5% by weight)
   Such as:
      Partial phosphoric acid esters.
      Ashless dithiocarbamates, dithiophosphates of amines, zinc dialkyldithiophosphate or zinc alkyldithiophosphate.
      Compounds based on phosphorus, sulfur, nitrogen and T.A.N.
      Preparations based on alkylphosphate neutralized by an amine with an amino derivative and a derivative of phenol.

5) ADHESIVE AGENT (1 to 8% by weight)
   Such as:
      Additives of the polyisobutylene type, petroleum resins, colophony esters.

6) WATER-REPELLANT—WATER-REPELLENT ADDITIVE (2 to 10% by weight)
   Such as:
      Amine salts
      Imidazoline
      Semi-ester of liquid oxydate converted into barium salt,or calcium salt.

Tests and experimental trials made by Applicants have shown that average switches could be treated in a few minutes by one person. Moreover, contrary to the prior art, it is no longer necessary to turn the switches during the lubrifying operation.

Likewise, the maintenance frequency may be reduced to 15 to 20 days. Similarly, the prior cleaning operations are no longer imposed.

The composition of the invention allows its easy application, then, once the solvent has evaporated, there remains the active part of the composition which has been able to be spread uniformly over the contact surfaces of the track equipment, without the detrimental, so-called "windscreen wiper" effect of the prior art appearing.

The invention is not limited to the described embodiment shown but includes on the contrary all variants as mentioned in the Claims hereinafter.

For example, the invention may be applied to the upkeep and maintenance of any track equipment or any other equipment requiring upkeep or maintenance by application of a lubrifying product.

Likewise, carrying on a man's back may consist of a structure of the rucksack type or an oxygen-bottle holding structure used in underwater diving.

Similarly, the speed of evaporation of the solvent is determined as a function in particular of the climatic conditions of the place where the equipment to be treated is located.

Likewise, the device of the invention may treat the track equipment and its mechanisms (catches, switching bars, etc . . . ).

I claim:

1. A method for maintaining railway track equipment comprising at least one mobile element and a stationary element, each with a contact surface called upon to bear against that of the other element, this method being of the type comprising a step of depositing on said respective contact surfaces, a given quantity of lubrifying composition, said composition comprising at least one solvent with a high evaporation coefficient such that only an active part of said composition which is spread uniformly on said contact surfaces remains and a wiping effect of said mobile element removing said active part is eliminated, in addition to a body presenting lubrifying properties, said step of depositing being carried out by a device comprising means for pressurizing the lubrifying composition and means for deposition said lubrifying composition substantially at ground level where the track equipment to be maintained is located.

2. The method according to claim 1 wherein the said depositing step consists in vaporizing, spraying or extruding said composition.

3. A method for maintaining track equipment as claimed in claim 1 wherein said solvent with a high evaporation coefficient is selected from the group consisting of hydrocarbon solvents, oxygenated solvents and chlorinated solvents.

4. A device for maintaining railway track equipment comprising at least one mobile element and a stationary element, each with a contact surface called upon to bear against that of the other element, said device being of the type comprising means adapted to deposit on the respective contact surfaces a given quantity of a lubrifying composition, said device comprising:

a reserve 10 of pressurized gas, a recipient 11 of the lubrifying composition a distributor 12 connecting the reserve 10 with the recipient 11, vaporization spray or extrusion means 15 disposed at the lower end of a rigid tube 16 forming a spray nozzle, its length being such that it may be gripped by its upper end by a standing user while the spray is disposed substantially at ground level where the track equipment is located, the distributor 12, being directly connected to the vaporization, spray or extrusion means 15 and the recipient 11.

5. The device according to claim 4 wherein the device also includes a time delay member adapted to interrupt the application of said composition after a given time, corresponding to a given quantity of the composition whatever effective time of actuation by a user of the means for depositing the composition.

* * * * *